United States Patent [19]

Neumann

[11] Patent Number: 5,284,817
[45] Date of Patent: * Feb. 8, 1994

[54] THERMAL DYE TRANSFER RECEIVER ELEMENT WITH ROUGHENED SURFACE

[75] Inventor: Stephen M. Neumann, Rochester, N.Y.

[73] Assignee: Eastman Kodak Company, Rochester, N.Y.

[*] Notice: The portion of the term of this patent subsequent to Nov. 24, 2009 has been disclaimed.

[21] Appl. No.: 980,899

[22] Filed: Nov. 24, 1992

[51] Int. Cl.$^5$ .................. B41M 5/035; B41M 5/38
[52] U.S. Cl. .................. 503/227; 40/159.2;
428/13; 428/14; 428/141; 428/192; 428/195;
428/412; 428/913; 428/914; 430/200; 430/945
[58] Field of Search .................. 40/159.2; 8/471;
428/13, 14, 192, 195, 412, 913, 914, 141;
503/227; 430/200, 945

[56] References Cited

U.S. PATENT DOCUMENTS 4,833,124  5/1989  Lum .................. 503/227
4,873,135 10/1989  Wittnebel et al. .................. 428/192

FOREIGN PATENT DOCUMENTS 62-207691  9/1987  Japan .
91/19221 12/1991  PCT Int'Appl. .

*Primary Examiner*—B. Hamilton Hess
*Attorney, Agent, or Firm*—Andrew J. Anderson

[57] ABSTRACT

A dye-receiving element for thermal dye transfer comprising a polymeric dye image-receiving section having a surface which has been roughened to provide an average surface roughness Ra of from about 0.03 to about 0.5 μm as determined by ANSI D-46.1 (1985). The roughened image-receiving surface does not exhibit as much image smear as non-roughened surfaces which are subjected to fusing after imaging.

18 Claims, 1 Drawing Sheet

THERMAL DYE TRANSFER RECEIVER ELEMENT WITH ROUGHENED SURFACE

This invention relates to thermal dye transfer receiving elements, and more particularly to receiving elements for a thermal dye transfer process which have a roughened dye-receiving section surface.

In recent years, thermal transfer systems have been developed to obtain prints from pictures and images which have been generated electronically from a color video camera. According to one way of obtaining such prints, an electronic picture is first subjected to color separation by color filters. The respective color-separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. A line-type thermal printing head may be used to apply heat from the back of the dye-donor sheet. The thermal printing head has many heating elements and is heated up sequentially in response to the cyan, magenta and yellow signals. The process is then repeated for the other two colors. A color hard copy is thus obtained which corresponds to the original picture viewed on a screen. Further details of this process and an apparatus for carrying it out are contained in U.S. Pat. No. 4,621,271 by Brownstein entitled "Apparatus and Method For Controlling A Thermal Printer Apparatus," issued Nov. 4, 1986, the disclosure of which is hereby incorporated by reference.

Another way to thermally obtain a print using the electronic signals described above is to use a laser instead of a thermal printing head. In such a system, the donor sheet includes a material which strongly absorbs at the wavelength of the laser. When the donor is irradiated, this absorbing material converts light energy to thermal energy and transfers the heat to the dye in the immediate vicinity, thereby heating the dye to its vaporization temperature for transfer to the receiver. The absorbing material may be present in a layer beneath the dye and/or it may be admixed with the dye. The laser beam is modulated by electronic signals which are representative of the shape and color of the desired image, so that each dye is heated to cause volatilization only in those areas in which its presence is required on the receiver to construct the color of the desired image. Further details of this process are found in GB 2,083,726A, the disclosure of which is hereby incorporated by reference. Additional sources of energy that may be used to thermally transfer dye from a donor to a receiver include light flash and ultrasound.

One possible way of viewing images on transparent supports is "slide" projection, commonly used to view photographic images. Slide transparancy images are generally projected with enlargement (e.g. at 100 power magnification) onto a large screen. Conventional photographic slide projection transparencies commonly consist of 24 mm by 36 mm image areas cut from a continuous 35 mm wide strip of photographic film. These image areas with their perforations are conventionally mounted within an approximately 2×2 inch (about 50 mm by 50 mm) die-cut cardboard or extruded plastic two-part or folded outer frame to form a slide-mount. The two parts are either snap-assembled or heat sealed with an auxilliary heatseal border-mask. More elaborate metal or plastic frames that involve glass protection are also known. The slide-mount frames provide protection so that individual slide images may be handled and stacked without damaging the image areas, and help retain the photographic image flat and in focus during projection. Further, a wide variety of conventional commercially available slide projectors are designed to enable handling of individual framed slides from a hopper or magazine for individual and sequential viewing.

Slides offer advantages in storing and viewing transparencies such as ease of handling the images and automated sequencing of images. While conventional slide-mount frames may be used with thermal dye-transfer images formed on transparent receivers to form slides which may be viewed with conventional slide projectors, their use requires cutting and assembly operations that are awkward, time-consuming, and expensive.

Copending, commonly assigned U.S. Pat. No. 5,234,886 of Sarraf et al., the disclosure of which is incorporated by reference, describes a receiver for thermal dye transfer imaging which does not require post-imaging framing and mounting assembly operations in order to be viewable in slide projectors. Such dye-receiving elements comprise a polymeric central dye image-receiving section and an integral polymeric frame section extending around the periphery of the central section, said frame section being from about ½ to about 3 mm thick. The receiving elements of U.S. Pat. No. 5,234,886 may be formed, for example, by any technique known in the "plastics art", such as injection molding, vacuum forming, or the like. These techniques generally result in smooth dye-receiving surfaces as a consequence of the smoothness of the mold from which they are produced. It has been found that images deposited on these smooth dye-receiving surfaces exhibit non-uniform dye absorption and smearing when they are subsequently fused by heat or solvent vapor. Images formed by thermal dye transfer on dye receiving elements comprising a coated dye-receiving layer on a support are also prone to smear during subsequent fusing steps. Such smearing is particularly a problem with images formed by laser thermal dye transfer, as such dye images tend to require more extensive fusing.

It would be desirable to provide dye receiving elements for thermal dye transfer which would not smear during fusing of the receiver element after it has been imaged. It would be further desirable to provide such a receiving element which was suitable for forming a slide for projection viewing without requiring post-imaging framing and mounting assembly operations.

These and other objects are achieved in accordance with this invention which comprises a dye receiving element for thermal dye transfer comprising a polymeric dye image-receiving section having a surface which has been roughened to provide an average surface roughness Ra of from about 0.03 to about 0.5 $\mu$m as determined by ANSI D-46.1 (1985).

The invention also comprises a thermal dye transfer process of forming an imaged element comprising a) imagewise-heating a dye-donor element comprising a support having thereon a dye layer, b) transferring portions of the dye layer to a dye-receiving element as described above to form a transferred dye image, and c) fusing the imaged dye-receiving element.

The invention also comprises a process of forming a roughened dye-receiving element.

The invention further comprises an imaged element obtained from the thermal dye transfer process of the invention.

A detailed description of the invention is given below with reference to the drawings, wherein.

In one embodiment of the invention, an integral receiver-frame format comprising dye-image receiving section 10 and frame section 20 as shown in FIGS. 1–4 is used which permits thermal dye-transfer images to be made directly on an integral unit that is projectable. No separate step of mounting or assembling of the transferred image is required. The frame length L and width W dimensions (FIG. 4) are chosen so that the receiver-frame is of a size suitable for use in a slide projector. Most commercially available slide projectors are designed to accommodate conventional photographic slide frames. Most conventional photographic slide frames are approximately 50 mm by 50 mm. The central dye image-receiving section length l and width w dimensions (FIG. 1) are selected to provide sufficient area for forming a desired image, while still maintaining a sufficient peripheral frame width such that the integral receiver-frame exhibits adequate dimensional stability and sufficient frame area so that the receiver-frame may be handled without damaging the central dye image-receiving section. Central area widths w and lengths l of from about 20 mm to about 40 mm are preferred for slides with overall lengths L and widths W of about 50 mm. For consistency with conventional photographic slides, lengths l of about 35 mm and widths w of about 23 mm are particularly preferred.

Figure 1:
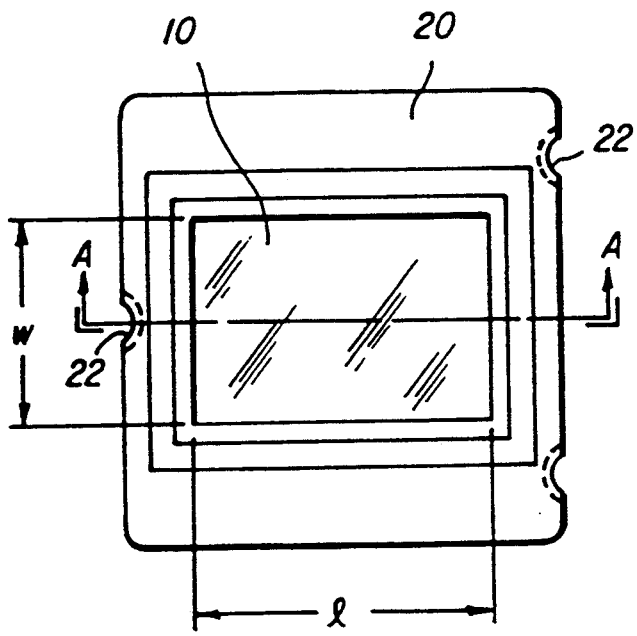
FIG. 1 is a plan view of one side of an integral receiver-frame according to one embodiment of the present invention.
Figure 3:
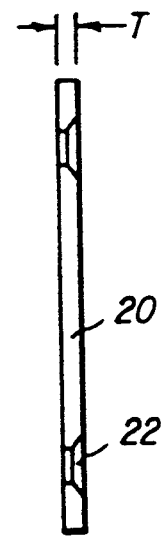
FIG. 3 is a side view of the receiver-frame illustrated in FIG. 1.
Figure 2:
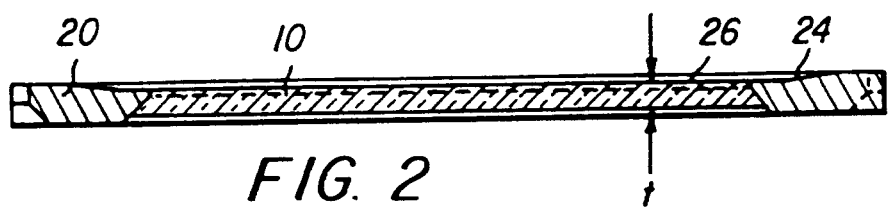
FIG. 2 is a cross-sectional view, taken along line "A"—"A" of FIG. 1, of the receiver-frame illustrated in FIG. 1.
Figure 4:
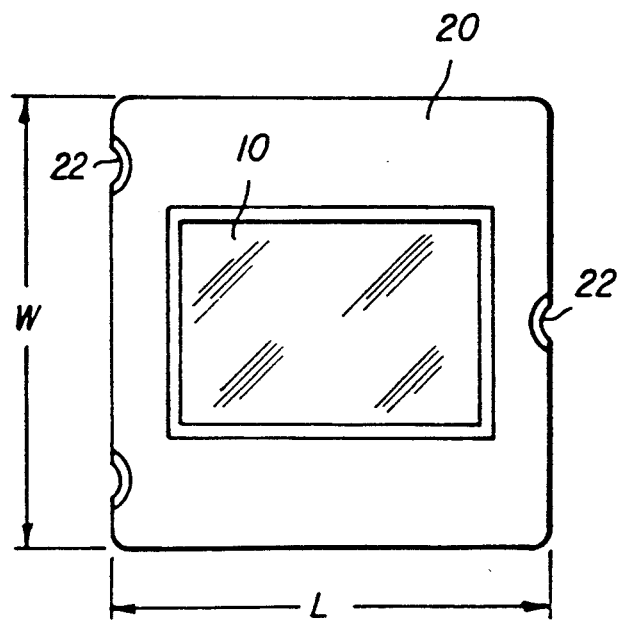
FIG. 4 is a plan view of the opposite side of the receiver-frame illustrated in FIG. 1.

The integral receiver-frame may be produced by any technique known in the "plastics art", such as injection molding, vacuum forming, or the like. The integral receiver-frame is conveniently produced from thermoplastic polymers, copolymers, or polymer mixtures that are moldable or extrudable and have the capability of accepting a thermally transferable dye. The central receiver section 10 of the receiver-frame is preferably thinner than the frame section 20 to minimize scratching if the receiver-frame were slid across a flat hard surface such as a table top. The thickness difference may be embodied by the center area for imaging being recessed below the frame border as shown in FIG. 2, or the frame border may contain elevated ridges or protrusions (not illustrated). The receiver frame thickness T (FIG. 3) should be from about ½ mm to about 3 mm thick, more preferably from about 1.5 mm to about 2.5 mm thick, to have the proper thickness and weight to drop in the gate of a slide projector. Preferred thickness for the central dye image-receiving section is from about 0.2 to about 2.0 mm. These integral receiver-frames are rigid enough to stack and to stay flat and in focus during projection.

Desirably, the frame section is substantially opaque (preferably having a transmission density of about 2.0 or greater) in order to minimize projected light flare. While the dye image-receiving section may be tinted to provide a uniform colored background for projected images, it is preferred that the dye image-receiving section be substantially transparent (e.g. having an optical transmission of 85% or greater) in order to maximize design flexibility for transferred images. If desired, the molding process can optionally be designed to create both an opaque border and a central transparent dye image receiving section. Logos or identification marks (not illustrated) may also be included in the border or central image area. If included in the central image area or in a transparent area of the border, such marks would be projectable. Further conventional slide features may also be incorporated into the integral receiver-frames. Indentations 22, e.g., may be molded in the edge of the border to be used as locating positions for a pin-mount projector so that multi-frame lap-dissolve techniques could be used with minimum shift of the projected image.

The polymeric material used for the outer frame and center image area may be the same, or other components may be selectively added to one part or the other. Two different polymers may be used for each of the frame and receiver section providing they are compatible for molding. These concepts involving molded features, opaque areas, and logos are well known in the art as described in the book "Injection Molding of Plastics" by Islyn Thomas, Reinhold Publishing Company, New York, 1947, which is incorporated by reference.

A variety of polymers are known to be suitable as receiving layers for thermal dye transfer using such techniques as laser, thermal head, or flash lamp. Within this broad class of polymers, those that are preferred for production of an integral receiver-frame, however, are more selective. Firstly, the polymers are preferably thermoplastic and meltable for casting or extrusion at a temperature between 100° and 350° C. The following additional criteria are also important. The polymer must be cast or molded in a thickness sufficient that the receiver-frame can be loaded into a projection tray, and will drop or move into the projector without gate jamming or bending when the tray is advanced. Generally speaking, this would require a thickness of at least about one half of a millimeter. On the other hand, the thickness of the receiver-frame should not be so large that it will not fit into the common sizes of projection trays. This would be an upper limit of about 3 mm or less.

Among various polymers, polycarbonates alone or in mixture with other polyesters and copolymers of polycarbonates and other polyesters are considered preferred. In a preferred embodiment, a bisphenol-A polycarbonate having a number average molecular weight of at least about 25,000 is used. Examples of such polycarbonates include General Electric LEXAN ® Polycarbonate Resin and Bayer AG MACROLON 5700 ®. Other polymer classes, with suitable selection, considered practical include cellulose esters, linear polyesters, styrene-acrylonitrile copolymers, styrene-ester copolymers, urethanes, and polyvinyl chloride. Optionally, the central dye image-receiving section may also be coated with an additional dye image-receiving layer comprising a polymer particularly effective at accepting transferred dye, such as a poly(vinyl alcohol-co-butyral).

While receiving elements comprising a polymeric central dye image-receiving section and an integral polymeric frame section extending around the periphery of the central section are used in one embodiment of the invention, the invention also applies to receiving elements comprising a support having on at least one surface thereof a polymeric dye-receiving layer. The support for this embodiment of the invention may be transparent or reflective, and may be a polymeric, a synthetic paper, or a cellulosic paper support, or laminates thereof. An additional polymeric layer may be present between the support and the dye image-receiving layer. For example, there may be employed a polyolefin such as polyethylene or polypropylene. White pigments such as titanium dioxide, zinc oxide, etc., may be added to the polymeric layer to provide reflectivity. In addition, a subbing layer may be used over this polymeric layer in order to improve adhesion to the dye image-receiving layer. Such subbing layers are disclosed in U.S. Pat. Nos. 4,748,150, 4,965,238, 4,965,239, and 4,965,241, the disclosures of which are incorporated by reference. Receiving layer polymers which may be used include polycarbonates, polyurethanes, polyesters, polyvinyl chlorides, poly(styrene-co-acrylonitrile), poly(caprolactone) or any other receiver polymer and mixtures thereof. The dye image-receiving layer may be present in any amount which is effective for its intended purpose. In general, good results have been obtained at a receiver layer concentration of from about 0.5 to about 10 g/m$^2$. The receiver element may also include a backing layer such as those disclosed in U.S. Pat. Nos. 5,011,814 and 5,096,875, the disclosures of which are incorporated by reference.

Whether in the form of an integral receiver-frame or a support bearing a coated dye receiving layer, the dye-receiving elements of the invention are characterized in having an image-receiving section which has been roughened to provide an average surface roughness Ra of from about 0.03 to about 0.5 μm as determined by ANSI D-46.1. Below about 0.03 μm, little improvement in dye smear is observed, while above about 0.5 μm, the surface becomes visually objectionable, especially for projected images.

The dye-donor that is used in the process of the invention comprises a support having thereon a heat transferable dye-containing layer. The use of dyes in the dye-donor permits a wide selection of hue and color and also permits easy transfer of images one or more times to a receiver if desired. The use of dyes also allows easy modification of density to any desired level.

Any dye can be used in the dye-donor employed in the invention provided it is transferable to the dye-receiving layer by the action of the heat. Especially good results have been obtained with sublimable dyes such as those disclosed in U.S. Pat. Nos. 4,541,830, 4,698,651, 4,695,287, 4,701,439, 4,757,046, 4,743,582, 4,769,360, and 4,753,922, the disclosures of which are hereby incorporated by reference. The dyes may be employed singly or in combination.

The dyes of the dye-donor element employed in the invention may be used at a coverage of from about 0.05 to about 1 g/m$^2$, and are dispersed in a polymeric binder such as a cellulose derivative, e.g., cellulose acetate hydrogen phthalate, cellulose acetate, cellulose acetate propionate, cellulose acetate butyrate, cellulose triacetate or any of the materials described in U.S. Pat. No. 4,700,207; a polycarbonate; polyvinyl acetate; poly(styrene-co-acrylonitrile); a poly(sulfone); a poly(vinyl alcohol-co-acetal) such as poly(vinyl alcohol-co-butyral); a poly(phenylene oxide); or a hydrophilic polymer such as gelatin as disclosed in copending, commonly assigned U.S. Ser. No. 07/988,895, filed Nov. 24, 1992, Docket. of Neumann and Guittard, the disclosure of which is incorporated by reference. The binder may be used at a coverage of from about 0.22 to about 5 g/m$^2$. The dye layer of the dye-donor element may be coated on the support or printed thereon by a printing technique such as a gravure process.

Any material can be used as the support for the dye-donor element employed in the invention provided it is dimensionally stable and can withstand the heat needed to transfer the sublimable dyes. Such materials include polyesters such as poly(ethylene terephthalate); polyamides; polycarbonates; cellulose esters such as cellulose acetate; fluorine polymers such as polyvinylidene fluoride or poly(tetrafluoroethylene-cohexafluoropropylene); polyethers such as polyoxymethylene; polyacetals; polyolefins such as polystyrene, polyethylene, polypropylene or methylpentane polymers; and polyimides such as polyimide-amides and polyetherimides. The support generally has a thickness of from about 2 to about 250 μm. It may also be coated with a subbing layer, if desired, such as those materials described in U.S. Pat. Nos. 4,695,288 or 4,737,486.

Various methods may be used to transfer dye from the dye donor to the dye receiving element. There may be used, for example, a resistive head thermal printer as is well known in the thermal dye transfer art. There may also be used a high intensity light flash technique with a dye-donor containing an energy absorptive material such as carbon black or a light-absorbing dye. Such a donor may be used in conjunction with a mirror which has a pattern formed by etching with a photoresist material. This method is described more fully in U.S. Pat. No. 4,923,860, and is preferred when multiple slides having identical images are desired.

In a further preferred embodiment of the invention, the imagewise-heating is done by means of a laser using a dye-donor element comprising a support having thereon a dye layer and an absorbing material for the laser, the imagewise-heating being done in such a way as to produce a desired pattern of colorants. The use of lasers to image-wise heat dye donors is particularly desirable as lasers enable grater image resolution than other heat sources, which is particularly useful when working with the relatively small image area of a slide element.

Several different kinds of lasers could conceivably be used to effect the thermal transfer of dye from a donor sheet to a dye-receiving element, such as ion gas lasers like argon and krypton; metal vapor lasers such as copper, gold, and cadmium; solid state lasers such as ruby or YAG; or diode lasers such as gallium arsenide emitting in the infrared region from 750 to 870 nm. However, in practice, the diode lasers offer substantial advantages in terms of their small size, low cost, stability, reliability, ruggedness, and ease of modulation. In practice, before any laser can be used to heat a dye-donor element, the laser radiation must be absorbed into the dye layer and converted to heat by a molecular process known as internal conversion. Thus, the construction of a useful dye layer will depend not only on the hue, sublimability and intensity of the image dye, but also on the ability of the dye layer to absorb the radiation and convert it to heat.

Thus, in a preferred embodiment of the process of the invention, a dye image is transferred by imagewise heating a dye-donor containing an infrared-absorbing material with a diode laser to volatilize the dye, the diode laser beam being modulated by a set of signals which is representative of the shape and color of the desired image, so that the dye is heated to cause volatilization only in those areas in which its presence is required on the dye-receiver.

Lasers which can be used to transfer dye from the dye-donor element to the dye image-receiving element are available commercially. There can be employed, for example, Laser Model SDL-2420-H2 ® from Spectrodiode Labs, or Laser Model SLD 304 V/W ® from Sony Corp. Laser thermal dye transfer imaging devices suitable for use in the process of the invention are disclosed in U.S. Pat. No. 5,066,962 of Sarraf et al. and U.S. Ser. No 07/457595 of Sarraf et al., both filed Dec. 27, 1989, the disclosures of which are hereby incorporated by reference.

Any material that absorbs the laser energy or high intensity light flash described above may be used as the absorbing material such as carbon black or nonvolatile infrared-absorbing dyes or pigments which are well known to those skilled in the art. Cyanine infrared absorbing dyes are described in U.S. Pat. No. 4,973,572, the disclosure of which is hereby incorporated by reference. Other materials which can be employed are described in U.S. Pat. Nos. 4,912,083, 4,942,141, 4,948,776, 4,948,777, 4,948,778, 4,950,639, 4,950,640, 4,952,552, 5,019,480, 5,034,303, 5,035,977, and 5,036,040.

The use of an integral receiver-frame according to one embodiment of the invention is particularly desirable when employing laser thermal dye transfer systems, as vacuum hold-down means are generally employed in such systems in order to achieve precise alignment of donor and receiver elements. The integral receiver-frame may be formed with smooth, gradual transitions 24 (FIG. 2) from the frame surface to the dye receiving surface 26 as shown in FIG. 2 in order to insure conformation of dye donor elements to the receiver-frame and precise vaccuum hold down.

After the dyes are transferred to the receiver, the image is treated to further diffuse the dye into the dye-receiving layer in order to stabilize the image. This may be done by thermal fusing (e.g., by radiant heating or contact with heated rollers) and/or solvent vapor fusing (e.g., exposure of the receiver to acetone vapor). The fusing step aids in preventing fading and surface abrasion of the image upon exposure to light and also tends to prevent crystallization of the dyes. Preferred radiant heating thermal fusing apparatus is described in U.S. Pat. No. 5,105,064, the disclosure of which is incorporated by reference.

In the above process, multiple dye-donors may be used in combination to obtain as many colors as desired in the final image. For example, for a full-color image, cyan, magenta, yellow and (optionally) black dye donor elements are normally used.

Spacer beads may be employed in a separate layer over the dye layer of the dye-donor in the above-described laser process in order to separate the dye-donor from the dye-receiver during dye transfer, thereby increasing its uniformity and density. That invention is more fully described in U.S. Pat. No. 4,772,582, the disclosure of which is hereby incorporated by reference. Alternatively, the spacer beads may be employed in or on the dye-receiver as described in U.S. Pat. No. 4,876,235, the disclosure of which is hereby incorporated by reference.

The dye-donor element employed in the invention may be used in sheet form or in a continuous roll or ribbon. If a continuous roll or ribbon is employed, it may have alternating areas of different dyes or dye mixtures, such as sublimable cyan and/or yellow and/or magenta and/or black or other dyes.

The following example is provided to further illustrate the invention.

Example

Molded receiving elements comprising GE Lexan SP1010 polyester-polycarbonate copolymer or Bayer AG Makrolon 2608PC polycarbonate were produced as illustrated in FIGS. 1-4 having the following dimensions:

L=50 mm
W=50 mm
l=34.2 mm
w=22.9 mm
T=2.25 mm
t=1.50 mm

Coated receiving elements were prepared by coating (1) a subbing layer of poly(methacrylate-covinylidene chloride-co-itaconic acid) (84:14:2 wt. ratio) (0.1 g/m$^2$), and (2) a dye-receiving layer of GE Lexan SP1010 polyester-polycarbonate copolymer (3.23 g/m$^2$) from a 70:30 wt ratio dichloromethane:1,1,2-trichloroethane solvent mixture on a 100 μm polyethyleneterephthalate film base.

Molded GE Lexan SP1010 receiving elements E-1 through E-5 were roughened by hand sanding with a series of dry sandpaper characterized in Table I. Molded Makrolon receiving element E-6 was roughened with the same grade of sandpaper as E-5. Coated GE Lexan SP1010 receiving elements E-7 through E-11 were roughed with the same series of sandpapers correspondingly used on E-1 through E-5. The surface characteristics of the resulting roughened GE Lexan Sp1010 molded integral receivers E-1 through E-5 are also set forth in Table I:

TABLE I

| | Sandpaper Initial Value | | | | Roughened Receiver Value | | | |
|---|---|---|---|---|---|---|---|---|
| | Ra | PPCM | Rz | Rmax | Ra | PPCM | Rz | Rmax |
| E-1 | 0.242 | 650 | 1.69 | 1.47 | 0.039 | 48 | 0.61 | 0.71 |
| E-2 | 1.132 | 514 | 7.67 | 7.08 | 0.05 | 51 | 0.73 | 1.03 |
| E-3 | 1.954 | 459 | 12.35 | 11.84 | 0.051 | 97 | 0.59 | 0.69 |
| E-4 | 1.696 | 571 | 11.35 | 9.41 | 0.142 | 323 | 1.32 | 1.37 |
| E-5 | 5.198 | 263 | 30.1 | 30.86 | 0.235 | 436 | 2.23 | 2.42 |

Ra: Average surface roughness as defined by ANSI D-46.1
PPCM: Particles per centimeter as defined by ANSI D-46.1
Rz: Average height as defined by ANSI D-46.1
Rmax: Maximum height as defined by ANSI D-46.1

Magenta dye-donor elements were prepared by coating on a 100 μm poly(ethylene terephthalate) support: 1) a layer of gelatin (3.77 g/m$^2$) and 1,1'-[methylenebis(-sulfonyl)]bisethene gelatin crosslinking agent (0.054 g/m$^2$), 2) a layer of gelatin (1.61 g/m$^2$) and polydivinylbenzene beads (9 μm average diameter) (0.02 g/m$^2$), and 3) a dye layer containing an aqueous magenta dye dispersion (0.57 g/m2), an aqueous carbon black dispersion (0.11 g/m2), gelatin (0.11 g/m2), and Bayer Fluortenside FT-248 tetraethylammonium perfluorooctylsulfonate surfactant (0.03 g/m2).

The magenta dye dispersion was obtained by dispersing 250 g of magenta dye of the following structure A1 in 475.8 g of distilled water and 274.7 g of an 18.2% aq. solution of Triton X-200 surfactant (Union Carbide Corp.).

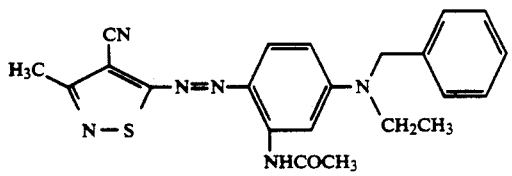

A1 Magenta Dye

The dye dispersion formulation was milled at 16° C. in a 1-liter media mill (Model LME1, Netzsch Inc.) filled to 75% by volume with 0.4 to 0.6 mm zirconia silica medium (obtainable from Quartz Products Corp., SEPR Division, Plainfield N.J.). The slurry was milled until a mean near infrared turbidity measurement indicated the particle size to have been less than or equal to 0.2 micron by discrete wavelength turbidimetry. This corresponded to a milling residence time of 45–90 minutes.

The aqueous carbon black (infrared-absorbing species) dispersion was obtained by mixing 200 g of Carbon Black (Black Pearls 430 from Cabot Chemical) with 635.2 g of distilled water and 164.8 g of an 18.2% aq. solution of Triton X-200 surfactant.

Yellow and cyan dye-donor elements were prepared similarly to the magenta dye-donor element, except either a similarly obtained yellow dye dispersion (0.45 g/m$^2$) of the following yellow dye A2 or cyan dye dispersion (0.78 g/m$^2$) of the following cyan dye A3 was substituted for the magenta dye dispersion.

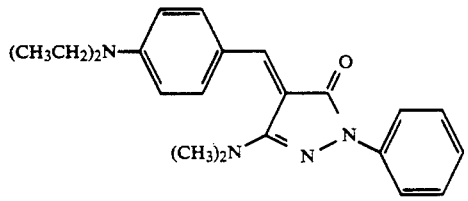

A2 Yellow Dye

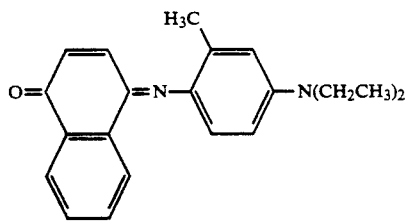

A3 Cyan Dye

Color images containing narrow lines were printed as described below from the dye donor elements onto the receiver elements using a laser imaging device similar to the one described in U.S. Ser. No. 457,595. The laser imaging device consisted of a single diode laser (Hitachi Model HL8351E) fitted with collimating and beam shaping optical lenses. The laser beam was directed onto a galvanometer mirror. The rotation of the galvanometer mirror controlled the sweep of the laser beam along the x-axis of the image. The reflected beam of the laser was directed onto a lens which focused the beam onto a flat platen equipped with vacuum groves. The platen was attached to a moveable stage whose position was controlled by a lead screw which determined the y axis position of the image. The receiving element was held tightly to the platen and the dye-donor element was held tightly to the receiver-frame by means of vacuum grooves.

The laser beam had a wavelength of 830 nm and a power output of 37 mWatts at the platen. The measured spot size of the laser beam was an oval 7 by 9 microns (with the long dimension in the direction of the laser beam sweep). The center-to-center line distance was 8.94 microns (2841 lines per inch) with a laser scanning speed of 26.3 Hz. With this device, the imaging electronics allow any kind of image to be printed.

The imaging electronics were activated and the modulated laser beam scanned each dye-donor successively to transfer dye to the receiving element. After imaging the receiving element was removed from the platen and the dyes were fused into the receiving polymer by exposure to radiant heat supplied from lamps having a color temperature of about 1963° K. for 45 seconds.

After fusing, photomicrographs (transmitted light, 78X magnification) were taken of a particular neutral gray line containing approximately equal amounts of each dye in each image and the width of that line was measured from the photomicrograph. The average line width for two similar receiving elements was calculated to obtain an indication of image smear. A subjective count of "white spots" (minus dye regions) in each imaged element was made under normal projection conditions. The results are presented in Table II:

TABLE II

|      | Line Width | % Improvement | White Spot Count |
|------|------------|---------------|------------------|
| C-1  | 0.199      | —             | 3.5              |
| E-1  | 0.179      | 9.7           | 2.5              |
| E-2  | 0.179      | 9.7           | 2                |
| E-3  | 0.167      | 16.1          | 1.5              |
| E-4  | 0.122      | 38.7          | 0                |
| E-5  | 0.128      | 35.5          | 0                |
| C-2  | 0.397      | —             | >15              |
| E-6  | 0.192      | 51.6          | 0                |
| C-3  | 0.173      | —             | *                |
| E-7  | 0.147      | 14.8          | *                |
| E-8  | 0.154      | 11.1          | *                |
| E-9  | 0.147      | 14.8          | *                |
| E-10 | 0.141      | 18.5          | *                |
| E-11 | 0.109      | 37.0          | *                |

C-1: Non-roughened molded GE Lexan SP1010
C-2: Non-roughened molded Bayer AG Makrolon 2608PC
C-3: Non-roughened coated GE Lexan SP1010
*Analysis not done for these samples The data in Table II show that for dye-receiving surfaces, smear resulting from fusing is decreased by roughening the receiving area surface before dye transfer, and that increased roughness in general leads to greater improvement. In addition, rougher slides qualitatively seem to afford fewer minus dye defects.

The invention has been described in detail with particular reference to preferred embodiments thereof, but it will be understood that variations and modifications can be effected within the spirit and scope of the invention.

What is claimed is:

1. A dye-receiving element for thermal dye transfer comprising a polymeric dye image-receiving section having a surface which has been roughened to provide an average surface roughness Ra of from about 0.03 to about 0.5 μm as determined by ANSI D-46.1, said element further comprising an integral polymeric frame section extending around the periphery of the dye image-receiving section, the frame section being from about ½ to about 3 mm thick, said element being suitable for forming a slide for projection viewing.

2. The element of claim 1, wherein the dye image-receiving section is thinner than said frame section.

3. The element of claim 2, wherein the frame section is from about 1.5 to about 2.5 mm thick.

4. The element of claim 1, wherein the dye image-receiving section and integral frame comprise a thermoplastic polymer.

5. The element of claim 4, wherein the dye image-receiving section and integral frame comprise a polycarbonate.

6. The element of claim 1, wherein external dimensions of the frame section are about 50 mm by 50 mm.

7. The element of claim 6, wherein the dimensions of the dye image-receiving section are about 23 mm by 35 mm.

8. The element according to claim 1, wherein the dye image-receiving section comprises a polymeric dye image-receiving layer, and further comprising a support bearing the dye image-receiving layer.

9. A process of forming a thermal dye transfer imaged element comprising
   a) imagewise-heating a dye-donor element comprising a support having thereon a dye layer,
   b) transferring portions of the dye layer to a dye-receiving element comprising a polymeric dye image-receiving section having a surface which has been roughened to provide an average surface roughness Ra of from about 0.03 to about 0.5 μm as determined by ANSI D-46.1 to form a transferred dye image said dye-receiving element further comprises an integral polymeric frame section extending around the periphery of the dye image-receiving section, the frame section being from about ½ to about 3 mm thick, said element being suitable for forming a slide for projection viewing, and
   c) fusing the imaged dye-receiving element by exposure to heat or solvent vapor.

10. The process of claim 9, wherein the dye image-receiving section is thinner than the frame section.

11. An imaged slide obtained by the process of claim 10.

12. The process of claim 9, wherein a dye image is transferred by imagewise heating a dye-donor containing an infrared-absorbing material with a diode laser to volatilize dye in the dye layer, the diode laser beam being modulated by a set of signals representative of the shape and color of a desired image.

13. The process of claim 12, wherein the infrared-absorbing material is an infrared absorbing dye.

14. The process of claim 12, wherein the infrared-absorbing material is carbon black.

15. The process of claim 9, wherein fusing step c) is performed by exposing the imaged dye-receiving element to radiant heat.

16. An imaged slide obtained by the process of claim 15.

17. An imaged slide obtained by the process of claim 9.

18. A process for forming a dye-receiving element for thermal dye transfer comprising:
   a) forming a dye-receiving element having a polymeric dye image-receiving section with an average surface roughness Ra of less than 0.03 μm as determined by ANSI D-46.1, said element further comprising an integral polymeric frame section extending around the periphery of the dye image-receiving section, the frame section being from about ½ to about 3 mm thick, said element being suitable for forming a slide for projection viewing, and
   b) roughening the dye image-receiving section to provide an average surface roughness Ra of from 0.03 to about 0.5 μm as determined by ANSI D-46.1.

* * * * *